US012769173B2

(12) United States Patent
Wang et al.

(10) Patent No.: US 12,769,173 B2
(45) Date of Patent: Oct. 20, 2026

(54) DISPLAY PANEL AND DISPLAY APPARATUS

(71) Applicant: Xiamen Tianma Micro-Electronics Co., Ltd., Xiamen (CN)

(72) Inventors: Hongyu Wang, Xiamen (CN); Zhijie Wang, Xiamen (CN); Liangjie Li, Xiamen (CN); Rong Chen, Xiamen (CN); Guochang Lai, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 588 days.

(21) Appl. No.: 18/351,984

(22) Filed: Jul. 13, 2023

(65) Prior Publication Data

US 2023/0375891 A1 Nov. 23, 2023

(30) Foreign Application Priority Data

Jan. 10, 2023 (CN) ......................... 202310037095.3

(51) Int. Cl.
*G09G 3/36* (2006.01)
*G02F 1/155* (2006.01)
(Continued)

(52) U.S. Cl.
CPC .............. *G02F 1/155* (2013.01); *G02F 1/167* (2013.01); *G02F 1/1676* (2019.01); *G09G 3/32* (2013.01);
(Continued)

(58) Field of Classification Search
CPC .... G02F 1/167; G02F 1/1368; G02F 1/13452; G02F 1/1345; G02F 1/136286; G02F 1/16757; G02F 2201/123; G02F 1/155; G02F 1/1676; G02F 2201/44; G02B 26/007; G02B 26/026
See application file for complete search history.

(56) References Cited

FOREIGN PATENT DOCUMENTS

| | | | | |
|---|---|---|---|---|
| CN | 101546084 | * | 9/2009 | ............ G02F 1/137 |
| CN | 106024846 A | | 10/2016 | |

(Continued)

OTHER PUBLICATIONS

Office Action mailed Sep. 24, 2025, issued in corresponding Chinese Application No. 202310037095.3, filed Jan. 10, 2023, 17 pages.

*Primary Examiner* — Brandi N Thomas
(74) *Attorney, Agent, or Firm* — Christensen O'Connor Johnson Kindness PLLC

(57) ABSTRACT

A display panel and a display apparatus are provided. The display panel includes a display area. The display area includes color pixels and pixel groups. The color pixels include a first pixel, a second pixel and a third pixel that have different colors from one another, each of the pixel groups includes one first pixel, one second pixel, one third pixel and at least one color-changing pixel. An operating state of the at least one color-changing pixel includes a transparent state and a black state. The display panel provided by the present disclosure can achieve a transparent display effect, and can also display black pixel information in an image by using a black state of the color-changing pixel, which solves the technical problem in the related art in which transparent display is difficult to display black pixel information in the image.

19 Claims, 10 Drawing Sheets

(51) Int. Cl.
*G02F 1/167* (2019.01)
*G02F 1/1676* (2019.01)
*G09G 3/32* (2016.01)

(52) U.S. Cl.
CPC ... *G09G 3/3607* (2013.01); *G09G 2300/0452* (2013.01); *G09G 2300/0478* (2013.01); *G09G 2310/0286* (2013.01)

(56) References Cited

FOREIGN PATENT DOCUMENTS

| | | | | |
|---|---|---|---|---|
| CN | 114519962 | A | 5/2022 | |
| KR | 20210158149 | A | 12/2021 | |
| TW | 201250863 | * | 12/2012 | ....... H01L 21/02483 |

* cited by examiner

DISPLAY PANEL AND DISPLAY APPARATUS

CROSS-REFERENCE TO RELATED APPLICATION

The present application claims priority to Chinese Patent Application No. 202310037095.3, filed on Jan. 10, 2023, the content of which is incorporated herein by reference in its entirety.

TECHNICAL FIELD

The present disclosure relates to the field of display technologies, and in particular, to a display panel and a display apparatus.

BACKGROUND

A transparent display device is a panel with light transmission and color display, which has high applicability in commercial advertisement and public services. The transparent display device includes three sub-pixels such as a red sub-pixel, a green sub-pixel and a blue sub-pixel, and a transparent area for light transmission. When pixels are not operational, the transparent display device itself does not emit light, so external light can penetrate the glass substrate to some extent, creating the display effect of regular transparent glass; and upon display, pixels in corresponding areas emit light to form an image, thus achieving display function and light penetration of the transparent display device. Pixel information in the image cannot be displayed in the current transparent display technology.

SUMMARY

A first aspect of the present disclosure provides a display panel. The display panel includes a display area, wherein the display area comprises color pixels and pixel groups; the color pixels comprise a first pixel, a second pixel and a third pixel that have different colors from one another, and each pixel group of the pixel groups comprises one first pixel, one second pixel, one third pixel and at least one color-changing pixel; and an operating state of the at least one color-changing pixel comprises a transparent state and a black state.

A second aspect of the present disclosure provides a display apparatus. The display apparatus includes the display panel mentioned in the first aspect.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to better understand objectives, technical solutions and advantages of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure shall fall into the protection scope of the present disclosure.

The terms used in the embodiments of the present disclosure are merely for the purpose of describing specific embodiments, rather than limiting the present disclosure. The terms “a”, “an”, “the” and “said” in a singular form in the embodiments of the present disclosure and the attached claims are also intended to include plural forms thereof, unless noted otherwise.

When an image that contains black pixel information is displayed, e.g., when a black screen is displayed, it is required that three sub-pixels such as red, green, and blue sub-pixels do not emit light. For a transparent display device, when red, green, and blue sub-pixels do not emit light, the transparent display device is in a transparent state, so that there is a significant difficulty when the transparent display device displays a black image. For example, when displaying a portrait image, the hair portion of a person cannot achieve clear display effect.

In order to solve the problems existing in the related art, the present disclosure provides a display panel, color pixels and color-changing pixels are disposed in pixel groups, and the color-changing pixel has a transparent state and a black state. When the color-changing pixel is in the transparent state, the light transmittance of the area where the pixel group is located can be guaranteed, and the display panel can be in a transparent state. When the color-changing pixel is in the black state, the color-changing pixel contributes to black display of the pixel group, and the display panel can display black pixel information in a display image.

Figure 1:
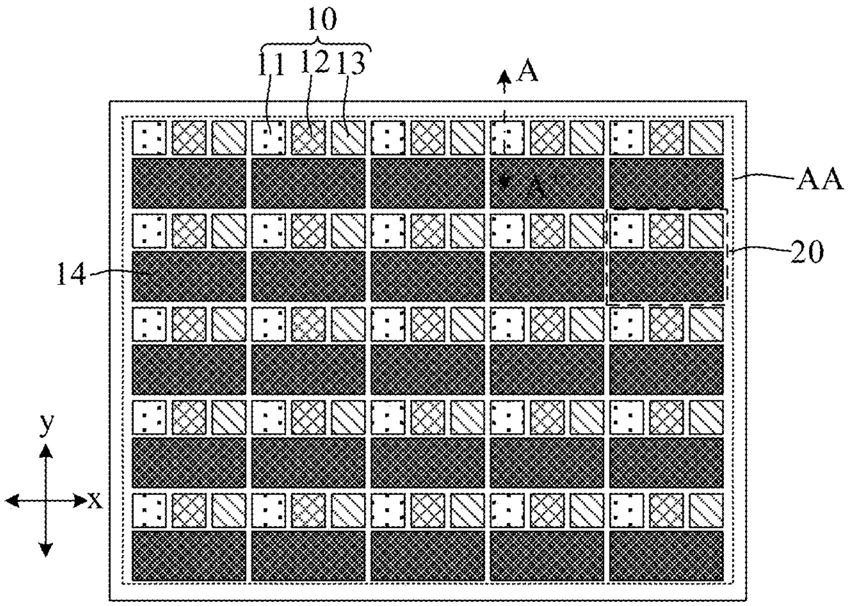
FIG. 1 is a schematic diagram of a display panel according to an embodiment of the present disclosure.

FIG. 1 is a schematic diagram of a display panel according to an embodiment of the present disclosure. As shown in FIG. 1, the display panel includes a display area AA which includes color pixels 10. The color pixel 10 includes a first pixel 11, a second pixel 12 and a third pixel 13 that have different colors. The first pixel 11, the second pixel 12 and the third pixel 13 are one of red, green and blue pixels, respectively. The color pixel 10 is a light-emitting diode (LED). In some embodiments, the color pixel 10 is an inorganic LED, such as a micro LED or mini LED. In other embodiments, the color pixel 10 is an organic light-emitting diode (OLED).

The display area AA includes pixel groups 20. The pixel groups 20 each include one first pixel 11, one second pixel 12, one third pixel 13 and at least one color-changing pixel 14. FIG. 1 schematically shows that the pixel group 20 includes one color-changing pixel 14. An arrangement manner of each pixel in the pixel group 20, and the number of color-changing pixels 14 are schematically shown. Multiple pixel groups 20 arranged in an array are included in the display area AA. In an embodiment, the pixel group 20 is used as the smallest pixel unit during displaying an image. In some embodiments of the present disclosure, the operating state of color-changing pixel 14 includes a transparent state and a black state, that is, the color-changing pixel 14 can switch between the transparent state and the black state.

In some embodiments of the present disclosure, the pixel group 20 includes one first pixel 11, one second pixel 12, one third pixel 13 and at least one color-changing pixel 14. The color pixels 10 and color-changing pixels 14 in the pixel group 20 are arranged in the plane of the display area AA. The cooperation of color pixels 10 in the pixel group 20 can achieve color pixel information in an image displayed by the pixel group 20. When the color-changing pixel 14 operates in a transparent state, the color-changing pixel 14 can be used as a transparent area in the display panel, making the display panel in a transparent state. When the operating state of the color-changing pixel 14 is a black state, the color-changing pixel 14 can contribute to the black display of the pixel group 10. When the color pixels in the pixel group do not emit light and the color-changing pixel is in a black state, the region where the pixel group is located will be in a black state as a whole, and the pixel group 20 can used to display black pixel information in the image. The display panel provided by the embodiments of the present disclosure can achieve the transparent display effect, and the display panel can also display black pixel information in an image by using a black state of the color-changing pixel 14, which solves the technical problem in the related art in which transparent display is difficult to display black pixel information in the image. For example, when the operating state of color-changing pixel 14 in all pixel groups 20 is in a black state, the display panel displays a black image as a whole.

In some embodiments, the pixel group 20 has a first state and a second state. In the first state, at least part of the color pixels 10 in the pixel group 20 emits light, and the operating state of the color-changing pixel 14 is a transparent state. In the second state, the color pixel 10 in the pixel group 20 does not emit light, and the operating state of the color-changing pixel 14 is a black state. In the first state, the color pixels 10 in the pixel group 20 matches with the color pixel information in the display image, the area where the color-changing pixel 14 is located is a transparent area in the display panel, a user can see objects behind the display panel through the area where the color-changing pixel 14 is located, the pixel group 20 presents a certain color and also has a certain light transmittance (for example, the light transmittance of the area where pixel group 20 is located reaches at least 50%), and the display panel has a transparent display effect. In the second state, since the color pixel 10 does not emit light and the color-changing pixel 14 is in a black state, the whole pixel group 20 is in a black state, and the pixel group 20 can display the black pixel information in the image. In this embodiment, the first state of the pixel group 20 is used to display the color pixel information in the image, and the second state of the pixel group 20 is used to display the black pixel information in the image. The display panel has transparent display effect, and can display the black pixel information in the image.

In some embodiments, the pixel group 20 further includes a third state. In the third state, none of color pixels 10 in the pixel group 20 emits light, and the operating state of the color-changing pixel 14 is a transparent state. In the third state, the pixel group 20 does not display pixel information, and is in the transparent state as a whole. A user can see the objects behind the display panel through the area where the color-changing pixel 14 is located. The third state can be considered as a non-operating state of the pixel group 20.

In some embodiments, an area of the color-changing pixels 14 accounts for no less than 50% of a total area of the pixel groups 20. Such configuration can ensure that the pixel group 20 has a high light transmittance when the color-changing pixel 14 is in a transparent state, making the overall display panel in a high transparent state.

In some embodiments, an area of the color-changing pixels 14 accounts for no less than 70% of a total area of the pixel group 20. The greater the proportion of the area of the color-changing pixel 14 in the total area of the pixel group 20, the greater the light transmittance of the whole area of the pixel group 20 when the color-changing pixel 14 is in a transparent state. This embodiment can ensure that the display panel as a whole has a high light transmittance when the color-changing pixel 14 is in a transparent state, improving the transparent effect of the display panel.

In some embodiments, the operating states of the color-changing pixel 14 include a transparent state, a black state, and at least one intermediate state. The light transmittance of the color-changing pixel 14 in the intermediate state is between its light transmittance in the transparent state and its light transmittance in the black state. If the operating states of the color-changing pixel 14 include the intermediate state, the pixel group 20 can have more diversified states, and the display panel can display more abundant images.

Figure 2:
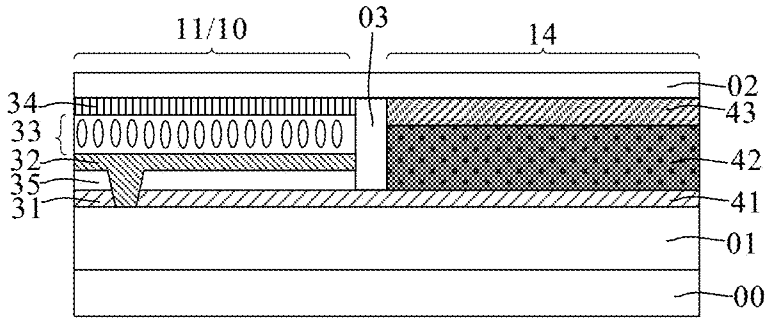
FIG. 2 is a section view at a position of line A-A' in FIG. 1 according to an embodiment of the present disclosure.

In some embodiments, the color-changing pixel 14 includes two electrodes stacked and a color-changing layer located between the two electrodes. FIG. 2 is a section view at a position of line A-A' in FIG. 1 according to an embodiment of the present disclosure. As shown in FIG. 2, the display panel includes a substrate 00. The color-changing pixel 14 and the color pixel 10 are located at a same side of the substrate 00. The display panel further includes a driving layer 01 configured to drive the color pixel 10 and the color-changing pixel 14. The color-changing pixel 14 includes a reference electrode 41, a color-changing layer 42, and a first pixel electrode 43 that are stacked. The color-changing layer 42 has electrochromic performance. Applying a voltage on the reference electrode 41 and the first pixel electrode 43, respectively can drive the state of the color-changing layer 42 to be changed, so that the color-changing pixel 14 has a transparent state and a black state. The color pixel 10 includes a common electrode 31. Multiple common electrodes 31 of color pixels 10 are interconnected, and the common electrode 31 is equivalent to a co-electrode of the color pixel 10. The reference electrode 41 and the common electrode 31 are manufactured in a same layer by a same material. In this embodiment, the reference electrode 41 in the color-changing pixel 14 and the common electrode 31 in the color pixel 10 can be manufactured in a same manufacturing process, thereby simplifying the manufacturing process. Meanwhile, a common layer is located between the color-changing pixel 14 and the color pixel 10, which is also conducive to achieving the uniformity of the overall thickness of the display panel.

As shown in FIG. 2, the display panel further includes a cover plate 02 which is used to protect the structure inside the display panel. In an embodiment, the cover plate 02 is a glass cover plate.

In an embodiment, as shown in FIG. 2, a separating structure is disposed between the color-changing pixel 14 and the color pixel 10, so that the color-changing pixel 14 and the color pixel 10 are independent of each other, avoiding interference.

In some embodiments, the reference electrode 41 and the common electrode 31 are integrally formed, so that the reference electrode 41 and the common electrode 31 have the same potential, the display panel can use one signal input terminal at the same time to provide the reference electrode 41 and the common electrode 31 with a voltage signal. Such configuration is beneficial to reducing the number of the signal input terminal in the display panel, and to reducing space occupation of the signal input terminal in the display panel. Meanwhile, it can also reduce the number of pins disposed in the display driving chip, and can save the production cost of the display driving chip.

In some embodiments, the color pixel 10 further includes a light-emitting layer which includes one or more of liquid crystal molecules, organic light-emitting materials, and inorganic light-emitting materials.

In FIG. 2, for example, the light-emitting layer includes liquid crystal molecules. As shown in FIG. 2, the color pixel 10 includes a common electrode 31, a second pixel electrode 32 and a light-emitting layer 33. The light-emitting layer 33 includes liquid crystal molecules. An electric field is generated after a voltage is applied on the common electrode 31 and the second pixel electrode 32, respectively. Liquid crystal molecules in the light-emitting layer 33 are deflected under driving of the electric field, so as to control the light transmittance to display. The color pixel 10 further includes a color filter 34 having a certain color. The light having a certain color can penetrate through the color filter 34. The color filter 34 can be used to achieve color display of color pixels 10. For example, red light can penetrate through the red color filter.

FIG. 2 schematically shows that the common electrode 31 and the second pixel electrode 32 are located in a same side of the light-emitting layer 33. An insulating layer 35 is further disposed between the common electrode 31 and the second pixel electrode 32. The relative positions of the common electrode 31 and the second pixel electrode 32 are interchangeable. In another embodiment, the common electrode 31 is located at a side of the second pixel electrode 32 adjacent to the light-emitting layer 33, which are no longer shown in the drawings.

In some embodiments, the light-emitting layer 33 includes liquid crystal molecules. The light-emitting layer 33 is located between a common electrode 31 and a second pixel electrode 32, which is no longer shown in the drawings.

Figure 3:
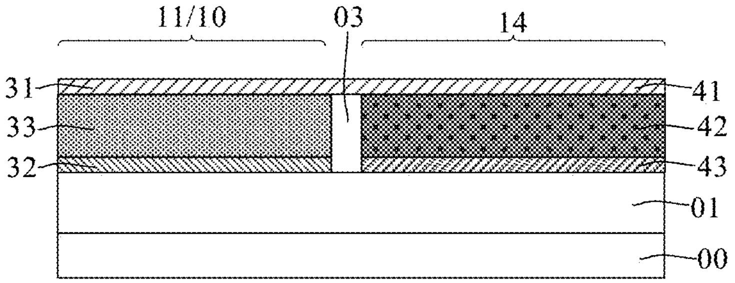
FIG. 3 is another section view at a position of line A-A' in FIG. 1 according to an embodiment of the present disclosure.

FIG. 3 is another section view at a position of line A-A' in FIG. 1 according to an embodiment of the present disclosure. In some embodiments, as shown in FIG. 3, the display panel includes a substrate 00 and a driving layer 01. The color-changing pixels 14 and the color pixels 10 are located at a same side of substrate 00. The color-changing pixel 14 includes a reference electrode 41, a color-changing layer 42 and a first pixel electrode 43 that are sequentially stacked. The color pixel 10 includes a common electrode 31, a light-emitting layer 33 and a second pixel electrode 32. The light-emitting layer 33 includes organic light-emitting materials or inorganic light-emitting materials. One of the common electrode 31 and the second pixel electrode 32 is an anode, and the other of the common electrode 31 and the second pixel electrode 32 is a cathode. After a voltage is applied on the common electrode 31 and the second pixel electrode 32 respectively, the materials of light-emitting layer 33 is excited to emit light. The reference electrode 41 and the common electrode 31 are integrally formed.

In some embodiments, the color-changing layer 42 in the color-changing pixel 14 includes electrochromic materials, which can be any of the materials that can change color under the action of an external electric field and current, such as silver halide or other organic electrochromic materials.

Figures 4A, 4B:
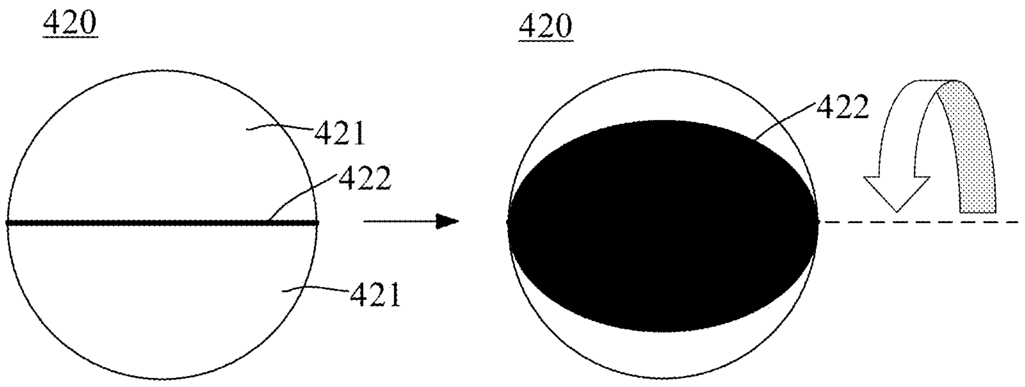
FIG. 4A and FIG. 4B are schematic diagrams of a color-changing particle according to an embodiment of the present disclosure.

In some embodiments, the color-changing layer 42 includes an electronic ink that includes multiple color-changing particles. FIG. 4 is a schematic diagram of a color-changing particle according to an embodiment of the present disclosure. FIG. 5 is a schematic diagram of states of a pixel group according to an embodiment of the present disclosure. As shown in FIG. 4, the color-changing particle 420 includes two transparent hemispheres 421 opposite to each other, and a black plane 422 located between the two transparent hemispheres 421. After a voltage is applied to the reference electrode 41 and the first pixel electrode 43 of the color-changing pixel 14, rotation of the color-changing particles 420 occurs. Taking FIG. 4 as a top view, it can be seen from a top view angle that when the color-changing particles 420 rotates, the state of the color-changing particles 420 changes from (a) to (b), and the black plane 422 will be exposed more. The black plane 422 has a certain light absorption effect, and the more the exposed area of the black plane 422, the worse the light transmittance of the color-changing pixel 14. When the color-changing particle 420 is in a state (a), the exposed area of black plane 422 is the smallest, and the light transmittance of the color-changing particle 420 is the highest, which can make the color-changing pixel 14 be in a transparent state. It can be understood that when the color-changing particle 420 rotates 90° from the state (a), the exposed area of black plane 422 is the largest, and the light transmittance of the color-changing particle 420 is the smallest, which can make the color-changing pixel 14 be in a black state.

Figures 5A, 5B, 5C:
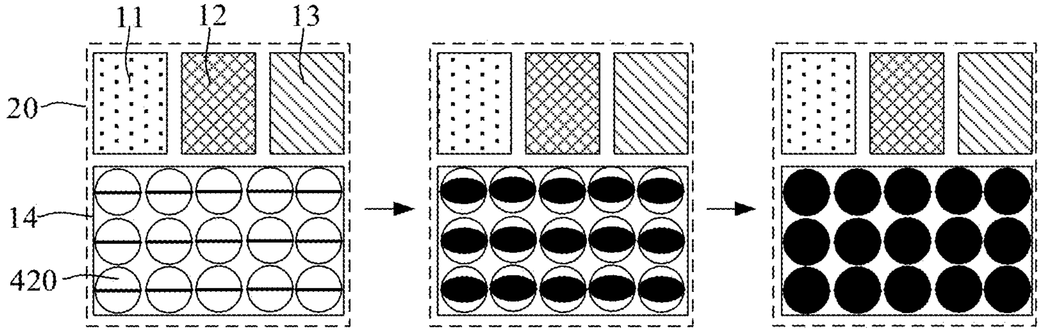
FIG. 5A, FIG. 5B and FIG. 5C are schematic diagrams of states of a pixel group according to an embodiment of the present disclosure.

As shown in FIG. 5, the color-changing pixel 14 in the pixel group 20 includes color-changing particles 420. The color-changing particle 420 has an initial state and a rotation state. For example, when the color-changing particles 420 are in the initial state, the color-changing pixel 14 is in a transparent state, so that after a voltage is applied to the reference electrode 41 and the first pixel electrode 43 respectively, the color-changing particle 420 is in the rotation state after the rotation occurs. By controlling the color-changing particle 420 to rotate at a certain angle, the color-changing pixel 14 can be in a black state. The rotation state of the color-changing particle 420 can be understood in combination with the embodiment of FIG. 4. In FIG. 5A, an initial state of color-changing particle 420 is shown. In the initial state, the black plane 422 of the color-changing particle 420 is perpendicular to the paper surface. At this time, the light transmittance of the color-changing particle 420 is the highest, and the color-changing pixel 14 is in a transparent state. The color-changing particle 420 rotates under control of an electric field. In FIG. 5B, an acute angle is formed between the black plane 422 of the color-changing particle 420 and the paper surface, and the color-changing particle 420 still has a certain light transmittance, which can make the color-changing pixel 14 be an intermediate state (or gray state). In FIG. 5C, it is indicated that the black plane 422 of the color-changing particle 420 is basically parallel to the paper surface. The black plane 422 blocks the light to make the light transmittance of the color-changing particle 420 be the minimum, and the color-changing pixel 14 is in a black state. In this embodiment, the light transmittance of the color-changing pixel 14 can be adjusted by controlling the rotation angle of the color-changing particle 420, so that the color-changing pixel 14 has a black state and an intermediate state.

The following embodiments illustrate the arrangement manners of color pixels 10 and color-changing pixels 14 in the pixel group 20, as well as the correspondence between the color pixel 10 and the color-changing pixel 14.

In some embodiments, as shown in FIG. 1, the pixel group 20 includes one color-changing pixel 14. In the pixel group 20: the first pixel 11, the second pixel 12, the third pixel 13 are arranged in the first direction x, and the color-changing pixel 14 is adjacent to the first pixel 11, the second pixel 12, the third pixel 13 in the second direction y, and the first direction x crosses the second direction y. In this embodiment, one color-changing pixel 14 is disposed in one pixel group 20, and a length of color-changing pixel 14 in the first direction x is approximately a sum of the length of three color pixels 20 in the first direction x. The pixel group 20 can be displayed as the smallest pixel unit, and the color-changing pixel 14 can be set in unit of pixel group 20. When the pixel group 20 is in the first state, the operating state of the color-changing pixel 14 is in a transparent state, and the color pixel 10 within the pixel group 20 is matched with the color pixel information in the display image. When the pixel group 20 is in the second state, the operating state of color-changing pixel 14 is in a black state; the color pixels 10 in pixel group 20 each does not emit light. The whole pixel group 20 is in a black state. The pixel group 20 can display the black pixel information in the image. In an embodiment, the color-changing pixels 14 in the adjacent pixel group 20 is independent of each other. Such configuration can not only achieve the black screen display in the display panel, but also display black in unit of pixel group 20, so that more diversified images displayed by the display panel is achieved. For example, black is displayed in unit of pixel group 20, so that the local black hair part of the portrait can be clearly displayed, and the display panel can achieve a complete portrait display.

Figure 6:
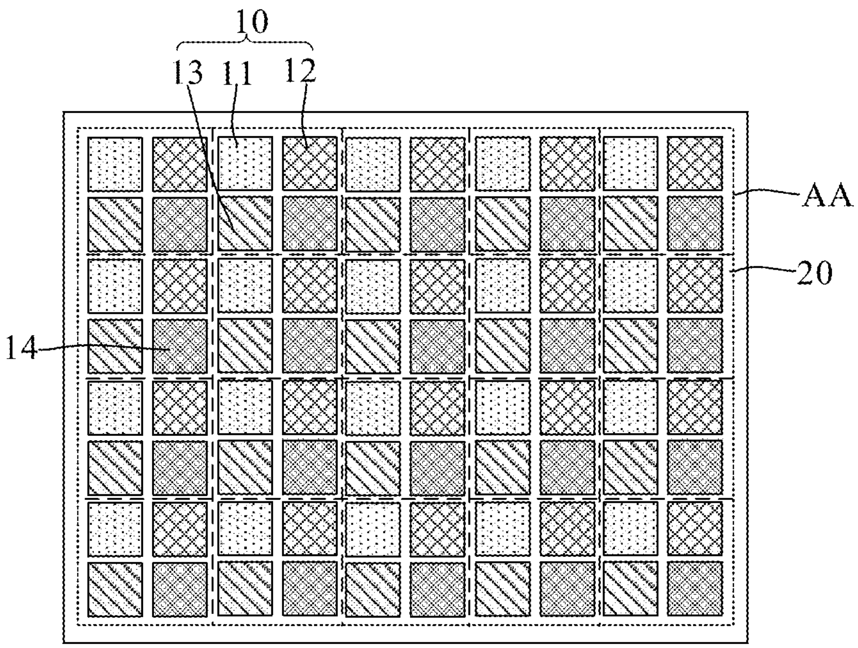
FIG. 6 a schematic diagram of a display panel according to another embodiment of the present disclosure.

FIG. 6 is a schematic diagram of a display panel according to another embodiment of the present disclosure. As shown in FIG. 6, the display area AA includes multiple pixel groups 20 partitioned by dotted lines crossing vertically and horizontally. The pixel groups 20 each include one color-changing pixel 14. In the pixel group 20: the first pixel 11, the second pixel 12, the third pixel 13 and the color-changing pixel 14 are arranged in a grid formation. The pixel groups 20 are arranged repeatedly in the display area AA, and the color-changing pixels 14 are evenly distributed in the display area AA to ensure the display effect of the display panel during transparent display. In addition, in this embodiment, black color can be displayed in unit of pixel group 20, achieving pixel-level black display, achieving more diversified images displayed by the display panel.

Figure 7:
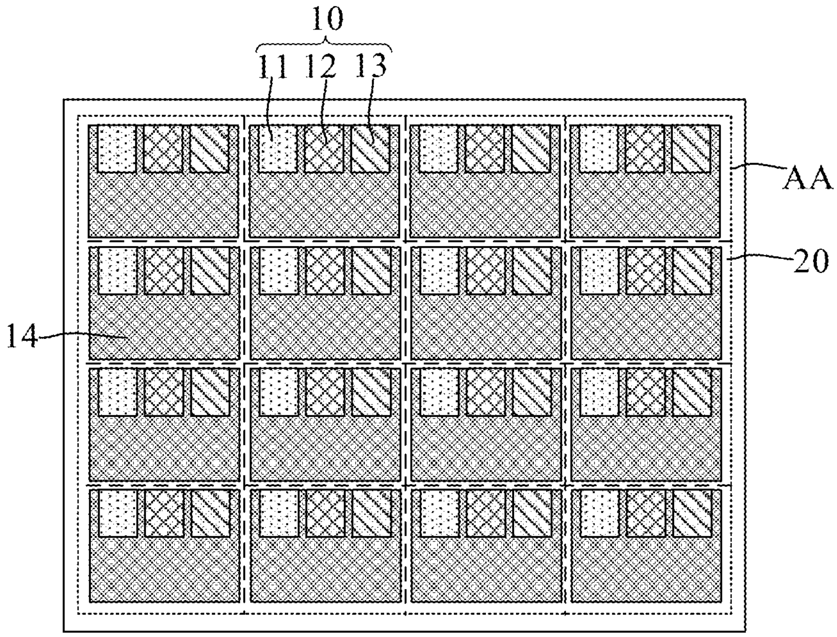
FIG. 7 a schematic diagram of a display panel according to another embodiment of the present disclosure.

FIG. 7 is a schematic diagram of a display panel according to another embodiment of the present disclosure. In FIG. 7, multiple pixel groups 20 are partitioned by dotted lines crossing vertically and horizontally. As shown in FIG. 7, the pixel group 20 includes one color-changing pixel 14. In a pixel group 20: the color-changing pixel 14 has three notches (indicated in the middle of FIG. 7), the first pixel 11, the second pixel 12, and the third pixel 13 are located in the notch respectively. In other words, in the area where the pixel group 20 is located, the color-changing pixel 14 surrounds the color pixel 10. That is, the area between adjacent color pixels 10 is also the color-changing pixel 14. In this way, the area between the color pixels within the pixel group 20 can be utilized to increase the area of the color-changing pixel 14. The increase of the area of color-changing pixel 14 can achieve a higher light transmittance of the pixel group 20 and ensure the transparency of the display panel when the color-changing pixel 14 is in a transparent state, and can achieve more pure black displayed by the pixel group 20 and improve the display contrast when the color-changing pixel 14 is in a black state. In addition, in this embodiment, black color can be displayed in unit of pixel group 20, achieving pixel-level black display, achieving more diversified images displayed by the display panel.

Figure 8:
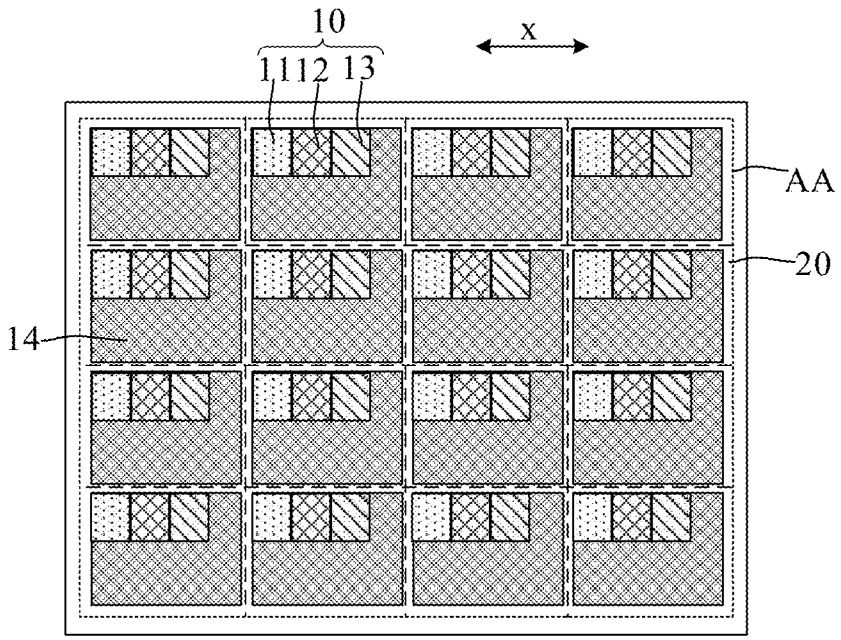
FIG. 8 is a schematic diagram of a display panel according to another embodiment of the present disclosure.

FIG. 8 is a schematic diagram of a display panel according to another embodiment of the present disclosure. In FIG. 8, multiple pixel groups 20 are partitioned by dotted lines crossing vertically and horizontally. As shown in FIG. 8, the pixel group 20 includes one color-changing pixel 14. In the pixel group 20: the color-changing pixel 14 has one notch (indicated in the middle of FIG. 8); the first pixel 11, the second pixel 12, and the third pixel 13 are arranged in the first direction x, and are located in the notch respectively. In this embodiment, three color pixels 10 are disposed in a concentrated manner in the pixel group 20, so that a distance between the color pixels 10 is relatively small, thereby improving the color mixing effect of the color pixels 10 in the pixel group 20. Moreover, the color-changing pixel 14 in the pixel group 20 surrounds the region of three color pixel 10, so that the pattern shape of the color-changing pixel 14 is relatively simple, which is conducive to simplifying the graphical process. In addition, in this embodiment, black color can be displayed in unit of pixel group 20, achieving pixel-level black display, achieving more diversified images displayed by the display panel.

Figure 9:
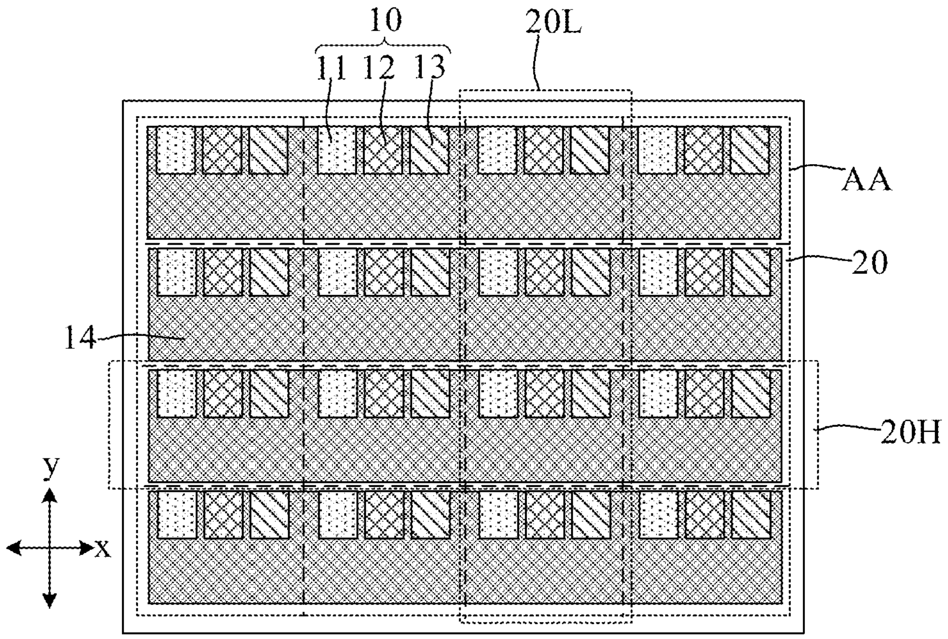
FIG. 9 is a schematic diagram of a display panel according to another embodiment of the present disclosure.

FIG. 9 is a schematic diagram of a display panel according to another embodiment of the present disclosure. In FIG. 9, multiple pixel groups 20 are partitioned by dotted lines crossing vertically and horizontally. As shown in FIG. 9, multiple pixel groups 20 are arranged in pixel rows 20H in the first direction X, and multiple pixel groups 20 are arranged in pixel columns 20L in the second direction Y. The first direction X and the second direction Y cross each other. The pixel group 20 includes one color-changing pixel 14. At least part of the color-changing pixels 14 in adjacent pixel groups 20 in the first direction x is interconnected. FIG. 9 schematically shows that multiple color-changing pixels 14 in multiple pixel groups 20 in a same pixel row 20H are interconnected. The operating states of interconnected color-changing pixels 14 can be controlled simultaneously, which can reduce the number of circuits for controlling the color-changing pixels 14, reduce wiring in the display panel, and save the wiring space of the display panel.

Figure 10:
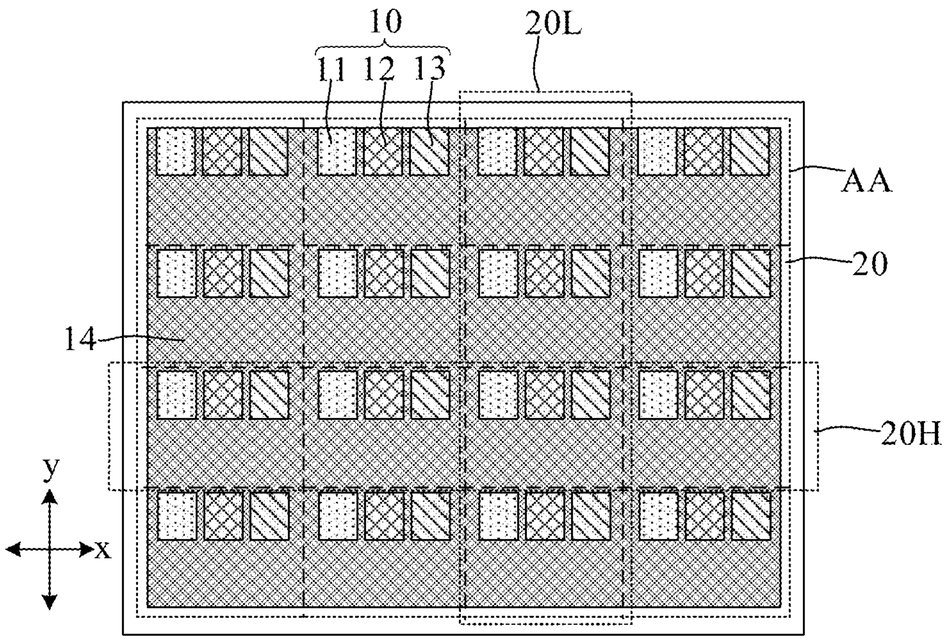
FIG. 10 is a schematic diagram of a display panel according to another embodiment of the present disclosure.

FIG. 10 is a schematic diagram of a display panel according to another embodiment of the present disclosure. As shown in FIG. 10, the color-changing pixels 14 in adjacent pixel groups 20 in the first direction x are interconnected, and the color-changing pixels 14 in adjacent pixel groups 20 in the second direction y are interconnected simultaneously. Multiple color-changing pixels 14 in the display area AA are interconnected to form a planar pixel. In the display panel, only planar pixels are required to be controlled by disposing a set of control circuits. Combined with FIG. 2 and FIG. 3, reference electrodes of multiple color-changing pixels 14 are interconnected, and first pixel electrodes of multiple color-changing pixels 14 are interconnected, that is, color-changing pixels 14 in multiple pixel groups 20 can be controlled simultaneously. This embodiment can achieve the conversion of color-changing pixels 14 in display area AA to a transparent state or a black state in a whole plane, so that the display panel can achieve black screen display. The control manner of the black image display is simple, the control circuits required by the color-changing pixels 14 in the display panel is small and the control manner is simple, which can reduce the number of pins of the display driving chip and reduce the production cost.

Figure 11:
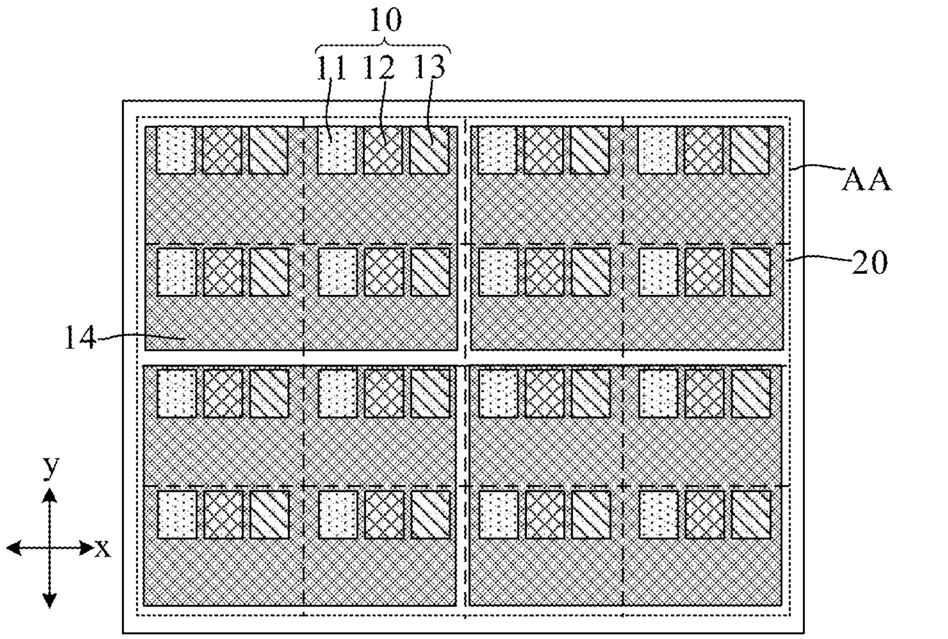
FIG. 11 is a schematic diagram of a display panel according to another embodiment of the present disclosure.

FIG. 11 is a schematic diagram of a display panel according to another embodiment of the present disclosure. As shown in FIG. 11, multiple pixel groups 20 are partitioned by dotted lines crossing vertically and horizontally. The color-changing pixels 14 in two adjacent pixel groups 20 in the first direction x are interconnected, and the color-changing pixels 14 in two adjacent pixel groups 20 in the second direction y are interconnected. This embodiment is equivalent to partitioning the display area AA. The color-changing pixels 14 in the partitions are interconnected, and each partition is independent of each other. A control circuit to control color-changing pixel 14 is disposed for each partition, so that each partition can be independently controlled to be a transparent state or a black state, achieving black screen displayed in the partitions.

Figure 12:
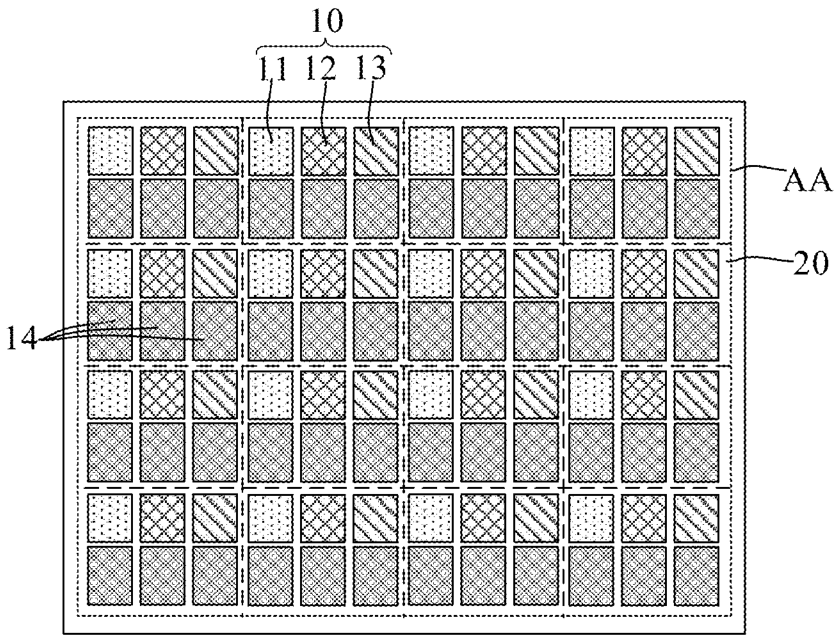
FIG. 12 is a schematic diagram of a display panel according to another embodiment of the present disclosure.

FIG. 12 is a schematic diagram of a display panel according to another embodiment of the present disclosure. As shown in FIG. 12, multiple pixel groups 20 are partitioned by dotted lines crossing vertically and horizontally. The pixel groups 20 include three color-changing pixels 14, one color pixel 10 corresponds to one color-changing pixel 14, and the operating states of color-changing pixels 14 in pixel group 20 are independent of each other. When the pixel group 20 is displayed as the smallest pixel unit, the color pixels 10 are equivalent to the sub-pixels in the pixel unit. In this embodiment, one color pixel 10 corresponds to one color-changing pixel 14, and the operating states of the color-changing pixels 14 in the pixel group 20 are independent from each other. The color-changing pixels 14 are assigned to sub-pixel level, the color-changing pixels 14 match with the corresponding color pixels 10 to display, so that the display contrast of the color pixels 10 can be adjusted, thus improving display quality.

Figure 13:
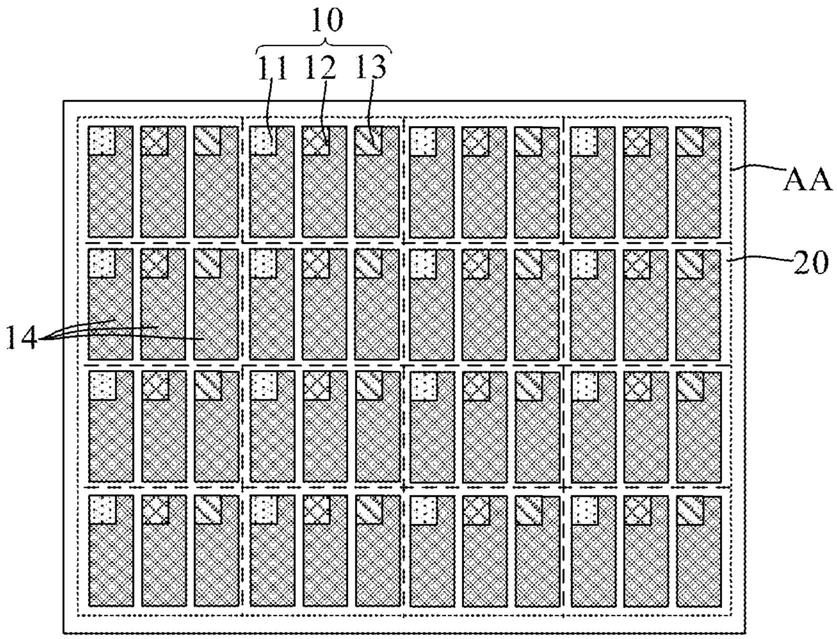
FIG. 13 is a schematic diagram of a display panel according to another embodiment of the present disclosure.

FIG. 13 is a schematic diagram of a display panel according to another embodiment of the present disclosure. As shown in FIG. 13, in a pixel group 20: one color pixel 10 corresponds to one color-changing pixel 14. The color-changing pixel 14 has one notch (not shown in FIG. 13), and the color pixel 10 is located in the notch. In this embodiment, an area of the color-changing pixels 14 is increased, which can achieve a higher light transmittance of the pixel group 20 and ensure the transparency of the display panel when the color-changing pixel 14 is in a transparent state, and can achieve more pure black displayed by the pixel group 20 and improve the display contrast when the color-changing pixel 14 is in a black state. In addition, the color-changing pixels 14 are assigned to sub-pixel level, the color-changing pixels 14 match with the corresponding color pixels 10 to display, so that the display contrast of the color pixels 10 can be adjusted, thus improving display quality.

In some embodiments, as shown in FIG. 13, one color pixel 10 corresponds to one color-changing pixel 14. An area of the color-changing pixel 14 is greater than an area of the color pixel 10. In one pixel group 20, a total area of the color-changing pixels 14 accounts for no less than 50% of a total area of the pixel groups 20. Such configuration can ensure that the pixel group 20 has a high light transmittance when the color-changing pixel 14 is in a transparent state, making the overall display panel in a high transparent state.

Figure 14:
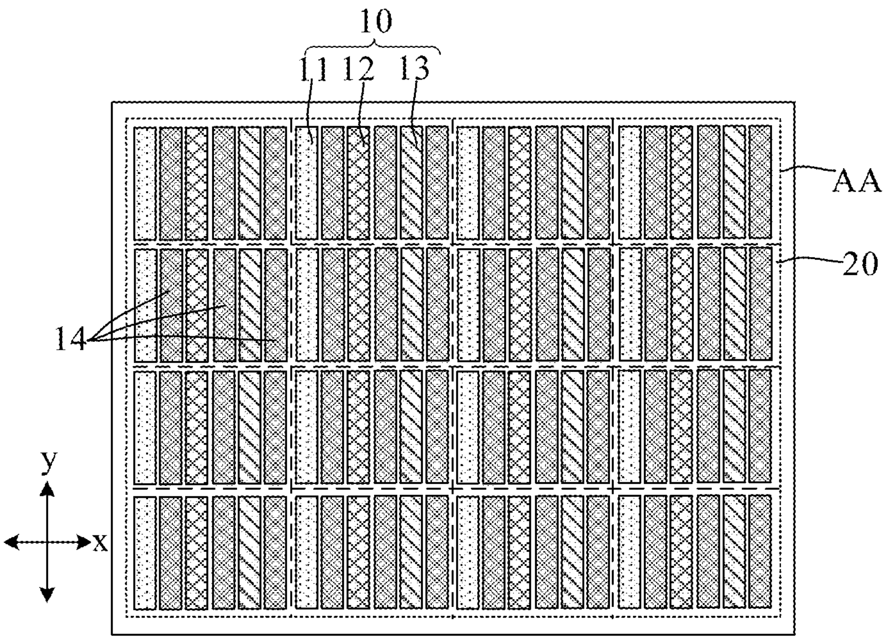
FIG. 14 is a schematic diagram of a display panel according to another embodiment of the present disclosure.

FIG. 14 is a schematic diagram of a display panel according to another embodiment of the present disclosure. As shown in FIG. 14, in a pixel groups 20: one color pixel 10 corresponds to one color-changing pixel 14. The color pixels 10 and the color-changing pixels 14 are arranged alternately in the first direction x. In this embodiment, the color-changing pixels 14 are assigned to sub-pixel level, the color-changing pixels 14 match with the corresponding color pixels 10 to display, so that the display contrast of the color pixels 10 can be adjusted, thus improving display quality. Moreover, in the pixel group 20, the color pixels 10 and the color-changing pixels 14 are arranged alternately, so that the color-changing pixels 14 is evenly distributed in the pixel group 20, ensuring light transmission uniformity of the pixel group 20 when the color-changing pixels 14 are in a transparent state, and improving the transparent effect of the display panel.

Figure 15:
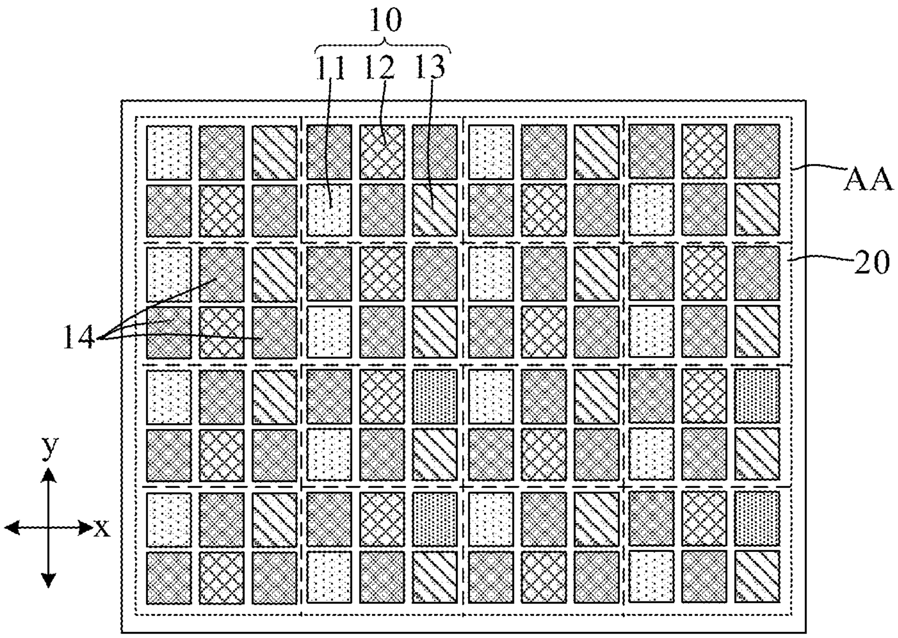
FIG. 15 is a schematic diagram of a display panel according to another embodiment of the present disclosure.

FIG. 15 is a schematic diagram of a display panel according to another embodiment of the present disclosure. As shown in FIG. 15, in a pixel group 20, one color pixel 10 corresponds to one color-changing pixel 14. The color pixels 10 and color-changing pixels 14 are arranged in 2 rows and 3 columns. The color-changing pixels 14 are adjacent to the color pixels 10 in both a row direction and a column direction. The row direction is a first direction x and the column direction is a second direction y. In this embodiment, the color-changing pixels 14 are assigned to sub-pixel level, the color-changing pixels 14 match with the corresponding color pixels 10 to display, so that the display contrast of the color pixels 10 can be adjusted, thus improving display quality. Moreover, from a whole side of the display area AA, the color-changing pixels 14 and the color pixels 10 are spaced at intervals, so that the color-changing pixels 14 is evenly distributed in the display area AA, ensuring light transmission uniformity of the display area AA when the color-changing pixels 14 are in a transparent state, and improving the transparent effect of the display panel.

Figure 16:
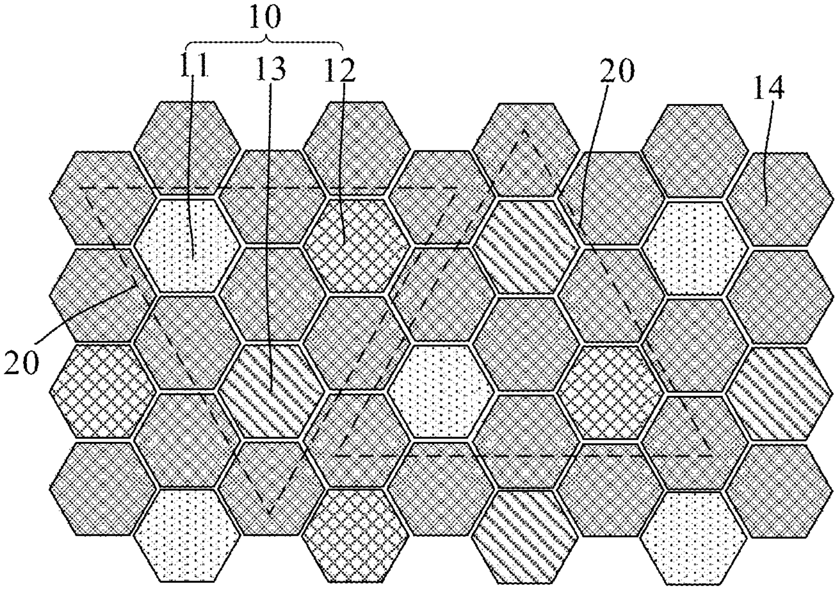
FIG. 16 is a schematic diagram of a display panel according to another embodiment of the present disclosure.

The above embodiments schematically show that the color pixels 10 has a rectangular shape. The shapes of the color-changing pixels 14 and the color pixels 10 are not limited in the present disclosure according specific requirements. In some embodiments, the shape of the color pixel 10 is a hexagon. FIG. 16 is a schematic diagram of a display panel according to another embodiment of the present disclosure. As shown in FIG. 16, the color pixel 10 includes a first pixel 11, a second pixel 12 and a third pixel 13 that have different colors. The shapes of the color pixels 10 and the color-changing pixels 14 are a hexagon. The pixel group 20 includes one first pixel 11, one second pixel 12, one third pixel 13 and one color-changing pixel 14.

Figure 17:
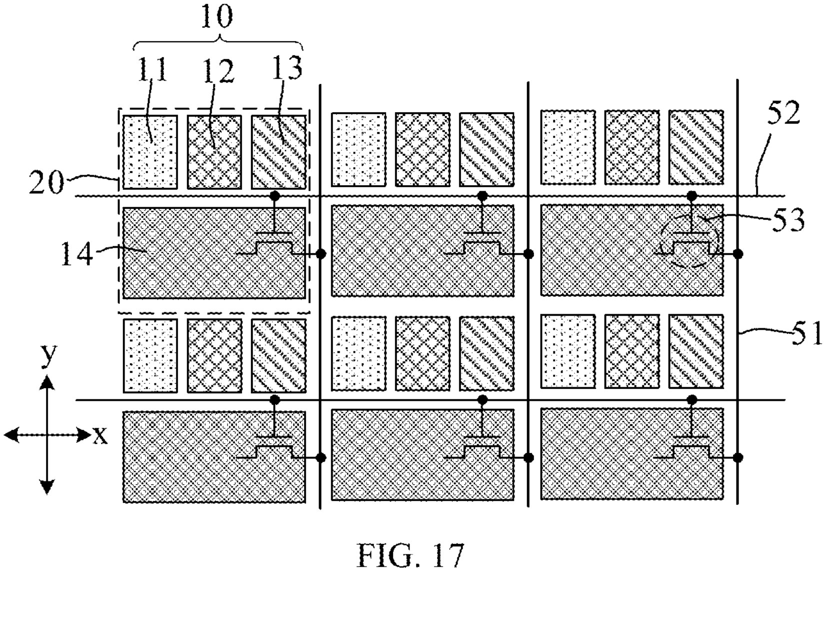
FIG. 17 is a schematic diagram of a display panel according to another embodiment of the present disclosure.

FIG. 17 is a schematic diagram of a display panel according to another embodiment of the present disclosure. As schematically shown in FIG. 17, one pixel group 20 includes one color-changing pixel 14. As shown in FIG. 17, the display panel includes a first data line 51 and a first selector line 52. The color-changing pixel 14 includes a driving switch 53. Combined with FIG. 2 and FIG. 3, the color-changing pixel 14 includes a reference electrode 41, a color-changing layer 42 and a first pixel electrode 43. The driving switch 53 has a control electrode coupled to the first selector line 52, a first electrode coupled to the first data line 51, and a second electrode coupled to the first pixel electrode 43. The reference electrode 41 of the color-changing pixel 14 receives a constant voltage signal, the first selector line 52 provides an enable signal to control the driving switch 53 to be turned on. After the driving switch 53 is turned on, the first data line 51 writes the first data signal to the first pixel electrode 43, so that a voltage difference is generated between the first pixel electrode 43 and the reference electrode 41 to control the transparency of the color-changing layer 42. For example, an initial state of color-changing pixel 14 is in a transparent state, and a voltage difference is generated between the first pixel electrode 43 and the reference electrode 41 so that the color-changing layer 42 changes from a transparent state to a black state, and the color-changing pixel 14 switches from the transparent state to the black state.

As shown in FIG. 17, the color-changing pixels 14 in multiple pixel groups 20 arranged along the first direction x are coupled to a same first selector line 52, the color-changing pixels 14 in multiple pixel groups 20 arranged along the second direction y are coupled to a same first data line 51.

As shown in FIG. 17, the driving switch 53 includes a thin film transistor manufactured in the driving layer of the display panel.

In some embodiments, the display panel includes multiple bonding pads configured to be electrically connected to a driving structure. The driving structure is either a crystal-coated film or a display driving chip. The bonding pads include first bonding pads connected to the first selector lines 52. The first selector lines 52 and the first bonding pads have one-to-one correspondence. The display driving chip directly provide signals to the first selector line 52.

In some embodiments, the display panel includes a shift driving circuit that includes multiple cascaded shift registers. The first selector line 52 is coupled to the shift register. The shift register provides a signal to the first selector line 52.

Figure 18:
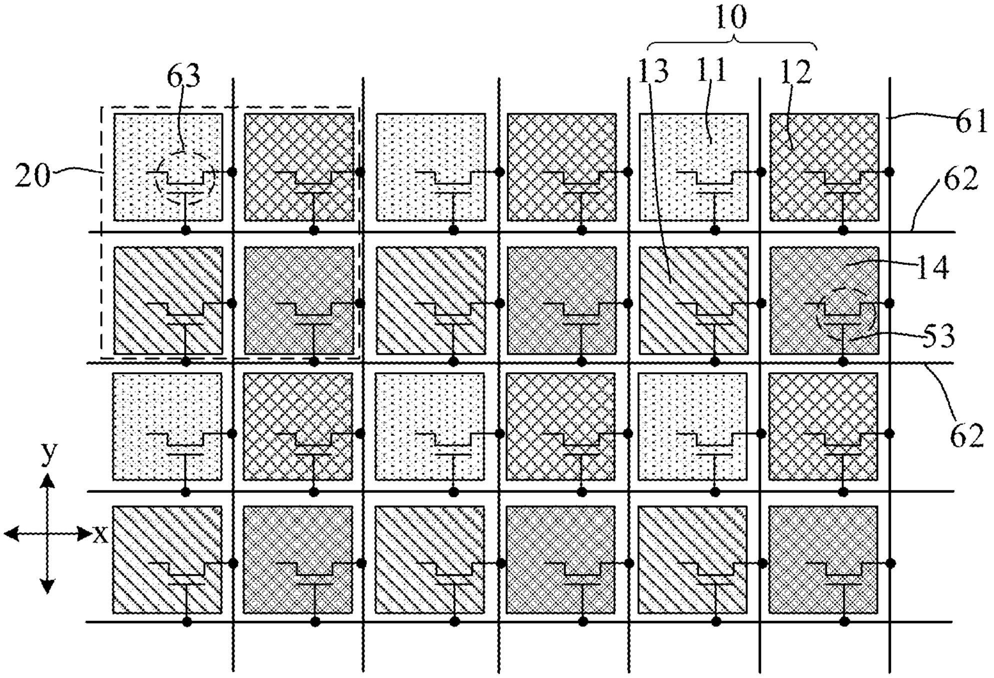
FIG. 18 is a schematic diagram of a display panel according to another embodiment of the present disclosure.

FIG. 18 is a schematic diagram of a display panel according to another embodiment of the present disclosure. As schematically shown in FIG. 18, one pixel group 20 includes one color-changing pixel 14. As shown in FIG. 18, the display panel includes a second data line 61 and a second selector line 62. The color pixel 10 is coupled to the second data line 61 and the second selector line 62, respectively. Multiple color pixels 10 arranged along the first direction x are coupled to a same second selector line 62, and multiple color pixels 10 arranged along the second direction Y are coupled to a same second data line 61. In an embodiment, the color pixel 10 includes a pixel switch 63. A control end of the pixel switch 63 is electrically connected to the second selector line 62, a first end of the pixel switch 63 is electrically connected to the second data line 61, and a second end of the pixel switch 63 is electrically connected to the second pixel electrode of the color pixel 10 (see FIG. 2 or FIG. 3).

The color-changing pixel 14 includes a driving switch 53. Referring to FIG. 2 or FIG. 3, the color-changing pixel 14 includes a reference electrode 41, a color-changing layer 42 and a first pixel electrode 43 that are stacked. The first electrode of the driving switch 53 is coupled to one second data line 61, and the second electrode of the driving switch 53 is coupled to the first pixel electrode 43. The control electrode of the driving switch 53 is coupled to one second selector line 62. The second data line 61 and the second selector line 62 cooperate to drive the color pixel 10 to emit light. In this embodiment, the second selector line 62 is used to control the switch state of the driving switch 53, and the second data line 61 is used to provide a data signal to the first pixel electrode 61, achieving that the control circuit of the color pixel 10 is reused to control the state switching of the color-changing pixel 14, pixel control integration is increased without separately arranging circuit trace for the color-changing pixel 14, simplifying the wiring manner of the display panel.

Figure 19:
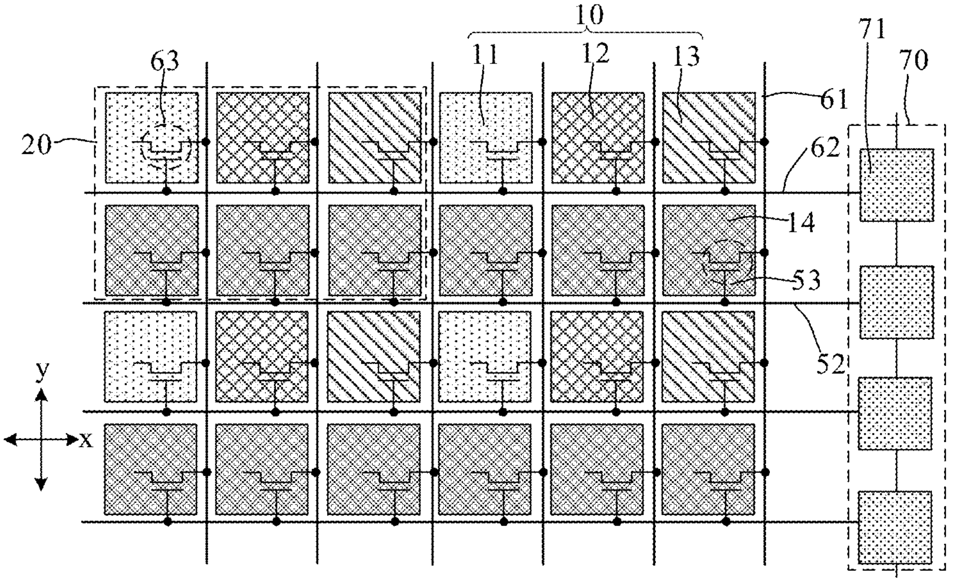
FIG. 19 is a schematic diagram of a display panel according to another embodiment of the present disclosure.

FIG. 19 is a schematic diagram of a display panel according to another embodiment of the present disclosure. FIG. 19 schematically shows that one color pixel 10 corresponds to one color-changing pixel 14 in the pixel group 20. As shown in FIG. 19, the display panel includes a second data line 61 and a second selector line 62. The color pixel 10 is coupled to the second data line 61 and the second selector line 62, respectively. Multiple color pixels 10 arranged along the first direction x are coupled to a same second selector line 62, and multiple color pixels 10 arranged along the second direction y are coupled to a same second data line 61. The color pixel 10 includes a pixel switch 63. A control end of the pixel switch 63 is electrically connected to the second selector line 62, a first end of the pixel switch 63 is electrically connected to the second data line 61, and a second end of the pixel switch 63 is electrically connected to the second pixel electrode of the color pixel 10 (see FIG. 2 or FIG. 3).

The color-changing pixel 14 includes a driving switch 53. Referring to FIG. 2 or FIG. 3, the color-changing pixel 14 includes a reference electrode 41, a color-changing layer 42 and a first pixel electrode 43 that are stacked. The first electrode of the driving switch 53 is coupled to one second data line 61, and the second electrode of the driving switch 53 is coupled to the first pixel electrode 43. The display panel further includes a first selector line 52. The control electrode of the driving switch 53 is coupled to the first selector line 52.

The display panel includes a drive circuit 70 which includes multiple cascaded shift registers 71. The first selector line 52 and the second selector line 62 are coupled to a same drive circuit. The shift register 71 is only simplified, which can be any structure of the related art that can achieve a signal shift function.

In this embodiment, one color pixel 10 corresponds to one color-changing pixel 14. In the pixel group 20, the color pixels 10 are located in different rows from the color-changing pixels 14. The color-changing pixel 14 and the color pixel 10 share the second data line 61, that is, one second data line 61 is coupled to the color-changing pixel 14 and the color pixel 10 simultaneously. The first selector line 52 driving the color-changing pixel 14 and the second selector line 62 driving the color pixel 10 are coupled to a same driving circuit 70. In this embodiment, the control circuit of the color pixel 10 is reused to control the state switching of the color-changing pixel 14, pixel control integration is increased without separately arranging circuit trace for the color-changing pixel 14, simplifying the wiring manner of the display panel.

Figure 20:
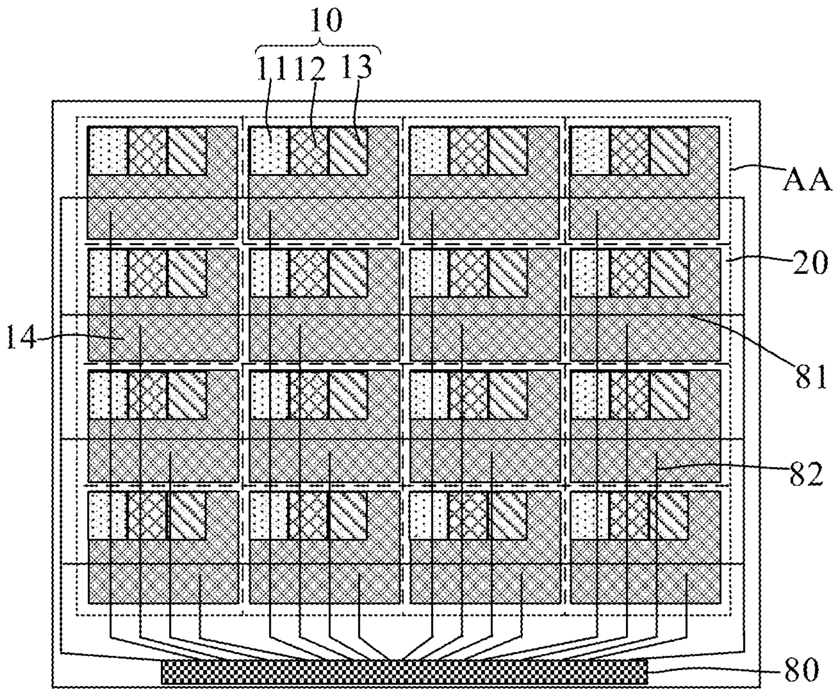
FIG. 20 is a schematic diagram of a display panel according to another embodiment of the present disclosure.

FIG. 20 is a schematic diagram of a display panel according to another embodiment of the present disclosure. In combination with the schematic diagram of the embodiments in FIG. 2 or FIG. 3, the color-changing pixel 14 includes a reference electrode 41, a color-changing layer 42 and a first pixel electrode 43 that are stacked. As shown in FIG. 20, the display panel includes a driving chip 80, a reference signal line 81 and color-changing signal line 82. The driving chip 80 is a display driving chip. One end of the reference signal line 81 is coupled to the driving chip 80, and the other end of the reference signal line 81 is coupled to the reference electrode 41. One end of the color-changing signal line 82 is coupled to the driving chip 80 and the other end of the color-changing signal line 82 is coupled to the first pixel electrode 43. It can be seen from FIG. 20 that multiple color-changing pixels 14 are coupled to a same reference signal line 81 which provides a constant voltage signal. Each color-changing pixel 14 is disposed with a reference signal line 81 correspondingly. In this embodiment, by using the driving chip 80, the operating states of the color-changing pixel 14 are directly controlled through the reference signal line 81 and the color-changing signal line 82, so that the control manner is simple without providing additional driving switch in the display panel, which can save the space of the display panel and improve the light transmittance of the display panel, ensuring the transparent display effect of the display panel when the color-changing pixel 14 is in a transparent state.

Figure 21:
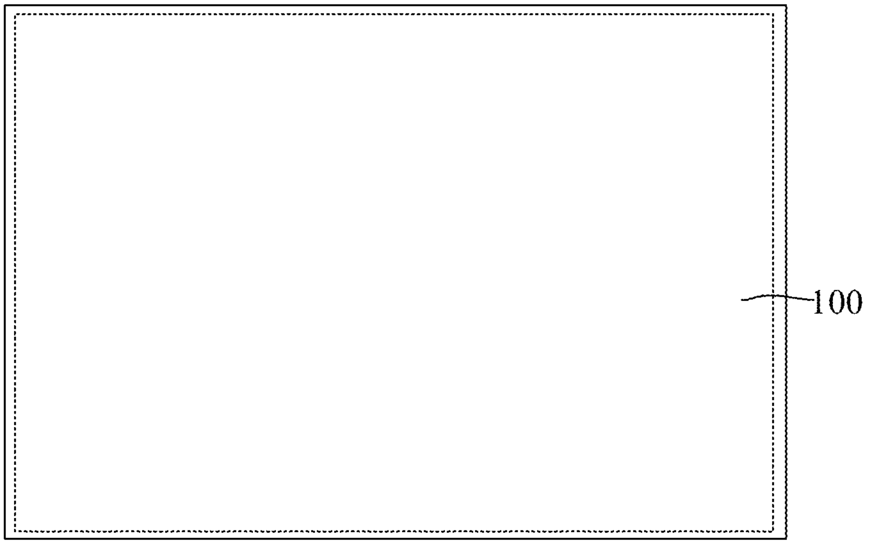
FIG. 21 is a schematic diagram of a display apparatus according to an embodiment of the present disclosure.

Based on the same concept of the present disclosure, the present disclosure provides a display apparatus. FIG. 21 is a schematic diagram of a display apparatus according to an embodiment of the present disclosure. As shown in FIG. 21, the display apparatus includes a display panel 100 provided by any embodiment of the present disclosure. The structure of the display panel 100 has been described in the above embodiments, which will not be repeated here. The display apparatus according to embodiments of the present disclosure can be portable electronic products, shop windows, information boards, advertising boards, windows of buildings or vehicles, or transparent television sets, and the like.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

What is claimed is:

1. A display panel, comprising a display area, wherein the display area comprises color pixels and pixel groups; the color pixels comprise a first pixel, a second pixel and a third pixel that have different colors from one another, and each pixel group of the pixel groups comprises one first pixel, one second pixel, one third pixel and at least one color-changing pixel; and an operating state of the at least one color-changing pixel comprises a transparent state and a black state, wherein each of the at least one color-changing pixel comprises a reference electrode, a color-changing layer and a first pixel electrode that are stacked, and each of the color pixels comprises a common electrode, and common electrodes of the color pixels are interconnected; and the reference electrode and the common electrode are manufactured with a same material and are arranged in a same layer.

2. The display panel according to claim 1, wherein:

each pixel group of the pixel groups has a first state and a second state, and for one pixel group of the pixel groups:

in the first state, at least part of the color pixels in the one pixel group emits light, and the operating state of the at least one color-changing pixel in the one pixel group is the transparent state;

in the second state, the color pixels in the one pixel group do not emit light, and the operating state of the at least one color-changing pixel in the one pixel group is the black state.

3. The display panel according to claim 1, wherein:

the reference electrode and the common electrode are integrally formed.

4. The display panel according to claim 1, wherein:

each of the at least one color-changing pixel comprises a reference electrode, a color-changing layer and a first pixel electrode that are stacked, the color-changing layer comprises an electrochromic material; or the color-changing layer comprises electronic ink, and color-changing particles in the electronic ink comprise two transparent hemispheres opposite to each other, and a black plane located between the two transparent hemispheres.

5. The display panel according to claim 1, wherein:

each pixel group of the pixel groups comprises one color-changing pixel; and in each pixel group of the pixel groups:

the first pixel, the second pixel and the third pixel are arranged in a first direction, the color-changing pixel is adjacent to the first pixel, the second pixel and the third pixel in a second direction, and the first direction intersects with the second direction.

6. The display panel according to claim 1, wherein:

each pixel group of the pixel groups comprises one color-changing pixel; and in each pixel group of the pixel groups the first pixel, the second pixel, the third pixel and the color-changing pixel are arranged in a 2×2 grid formation.

7. The display panel according to claim 1, each pixel group of the pixel groups comprises one color-changing pixel; and in each pixel group of the pixel groups the color-changing pixel has three notches in which the first pixel, the second pixel, and the third pixel are located respectively.

8. The display panel according to claim 1, wherein:

each pixel group of the pixel groups comprises one color-changing pixel; and in each pixel group of the pixel groups:
the color-changing pixel has one notch; and
the first pixel, the second pixel, and the third pixel are arranged in a first direction, and are located in the notch.

9. The display panel according to claim 1, wherein:
the pixel groups are arranged into pixel rows in a first direction, and are arranged into pixel columns in a second direction intersecting with the first direction;
each pixel group of the pixel groups comprises one color-changing pixel; and
the color-changing pixels in at least two pixel groups of the pixel groups that are adjacent in the first direction are interconnected; or the color-changing pixels in at least two pixel groups of the pixel groups that are adjacent in the second direction are interconnected.

10. The display panel according to claim 1, wherein:
each pixel group of the pixel groups comprises three color-changing pixels, one color pixel corresponds to one color-changing pixel, and operating states of the three color-changing pixels in one pixel group of the pixel groups are independent from one another.

11. The display panel according to claim 10,
one of the three color-changing pixel has a notch, in which one of the color pixels is located.

12. The display panel according to claim 10, wherein:
in one pixel group of the pixel groups the color pixels and the color-changing pixels are arranged alternately in the first direction.

13. The display panel according to claim 10, wherein:
in one pixel group of the pixel groups the color pixels and the color-changing pixels are arranged in 2 rows and 3 columns, and
the color-changing pixels are adjacent to the color pixels in both a row direction and a column direction.

14. The display panel according to claim 10, wherein:
an area of one of the color-changing pixels is greater than an area of one of the color pixels.

15. The display panel according to claim 1, further comprising: a first data line and a first selector line, wherein:
the at least one color-changing pixel comprises a driving switch, a reference electrode, a color-changing layer and a first pixel electrode, wherein the reference electrode, the color-changing layer and the first pixel electrode are stacked; and
the driving switch has a control electrode coupled to the first selector line, a first electrode coupled to the first data line, and a second electrode coupled to the first pixel electrode.

16. The display panel according to claim 1, further comprising: a second data line and a second selector line, wherein:
the at least one color-changing pixel comprises a driving switch, a reference electrode, a color-changing layer and a first pixel electrode, wherein the reference electrode, the color-changing layer and the first pixel electrode are stacked; and
the driving switch has a first electrode coupled to one second data line, a second electrode coupled to the first pixel electrode, and a control electrode coupled to one second selector line.

17. The display panel according to claim 1, further comprising: a second data line, a second selector line, a first selector line and a drive circuit, wherein:
the at least one color-changing pixel comprises a driving switch, a reference electrode, a color-changing layer and a first pixel electrode, wherein the reference electrode, the color-changing layer and the first pixel electrode are stacked;
the driving switch has a first electrode coupled to one second data line, a second electrode coupled to the first pixel electrode, and a control electrode coupled to the first selector line;
the driving circuit comprises cascaded shift registers; and
the first selector line and the second selector line are coupled to a same driving circuit.

18. The display panel according to claim 1, further comprising: a driving chip, a reference signal line and a color-changing signal line, wherein:
each of the at least one color-changing pixel comprises a reference electrode, a color-changing layer and a first pixel electrode that are stacked; and
the reference signal line has one end coupled to the driving chip, and another end coupled to the reference electrode; and the color-changing signal line has one end coupled to the driving chip, and another end coupled to the first pixel electrode.

19. A display apparatus comprising a display panel, wherein the display panel comprises a display area, wherein the display area comprises color pixels and pixel groups; the color pixels comprise a first pixel, a second pixel and a third pixel that have different colors from one another, and
each pixel group of the pixel groups comprises one first pixel, one second pixel, one third pixel and at least one color-changing pixel; and an operating state of the at least one color-changing pixel comprises a transparent state and a black state,
wherein each of the at least one color-changing pixel comprises a reference electrode, a color-changing layer and a first pixel electrode that are stacked, and each of the color pixels comprises a common electrode, and common electrodes of the color pixels are interconnected; and
the reference electrode and the common electrode are manufactured with a same material and are arranged in a same layer.

* * * * *